(12) United States Patent
Eyer

(10) Patent No.: US 8,730,301 B2
(45) Date of Patent: *May 20, 2014

(54) SERVICE LINKAGE TO CAPTION DISPARITY DATA TRANSPORT

(75) Inventor: Mark Kenneth Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 405 days.

This patent is subject to a terminal disclaimer.

(21) Appl. No.: 13/022,828

(22) Filed: Feb. 8, 2011

(65) Prior Publication Data

US 2011/0221863 A1 Sep. 15, 2011

Related U.S. Application Data

(60) Provisional application No. 61/415,924, filed on Nov. 22, 2010, provisional application No. 61/415,457, filed on Nov. 19, 2010, provisional application No. 61/346,652, filed on May 20, 2010, provisional application No. 61/313,612, filed on Mar. 12, 2010, provisional application No. 61/316,733, filed on Mar. 23, 2010, provisional application No. 61/378,792, filed on Aug. 31, 2010.

(51) Int. Cl.
*H04N 13/00* (2006.01)

(52) U.S. Cl.
CPC ................ *H04N 13/007* (2013.01)
USPC ............................... 348/43; 348/468

(58) Field of Classification Search
CPC ................................... H04N 13/007
USPC ........... 348/43, 473; 375/240.16; 345/566, 43
See application file for complete search history.

(56) References Cited

U.S. PATENT DOCUMENTS

| 5,200,823 A * | 4/1993 | Yoneda et al. ............... 348/473 |
| 5,519,443 A | 5/1996 | Salomon et al. |
| 7,848,425 B2 * | 12/2010 | Cho et al. .................. 375/240.16 |
| 7,999,820 B1 * | 8/2011 | Weitkemper et al. ......... 345/566 |

(Continued)

FOREIGN PATENT DOCUMENTS

WO    WO 2010/010499    1/2010

OTHER PUBLICATIONS

International Search Report and Written Opinion, PCT/US2011/026698, dated May 5, 2011; Received May 18, 2011.

(Continued)

*Primary Examiner* — Y Lee
*Assistant Examiner* — Joseph Suh
(74) *Attorney, Agent, or Firm* — Miller Patent Services; Jerry A. Miller

(57) ABSTRACT

A method of processing disparity data for closed captions for three dimensional video involves receiving closed caption data including closed caption text within a service block having a service number in the range of 1-6; mapping the service number to a corresponding mapped extended service having a service number in the range of 7 through 63; parsing the disparity data from the closed caption data appearing in the mapped extended service; receiving closed caption text data; and processing the caption text and disparity data to produce an output suitable for defining a rendering of a three dimensional image on a display of the caption text at a z-axis position defined by the disparity data. This abstract is not to be considered limiting, since other embodiments may deviate from the features described in this abstract.

21 Claims, 6 Drawing Sheets

(56) References Cited

U.S. PATENT DOCUMENTS

2003/0035063 A1    2/2003    Orr
2009/0060044 A1    3/2009    Suh et al.
2010/0157025 A1*    6/2010    Suh et al. ..................... 348/51

OTHER PUBLICATIONS

CEA Standard: Digital Television (DTV) Closed Captioning, CEA-708-D, pp. 18-22, Aug. 2008.

* cited by examiner

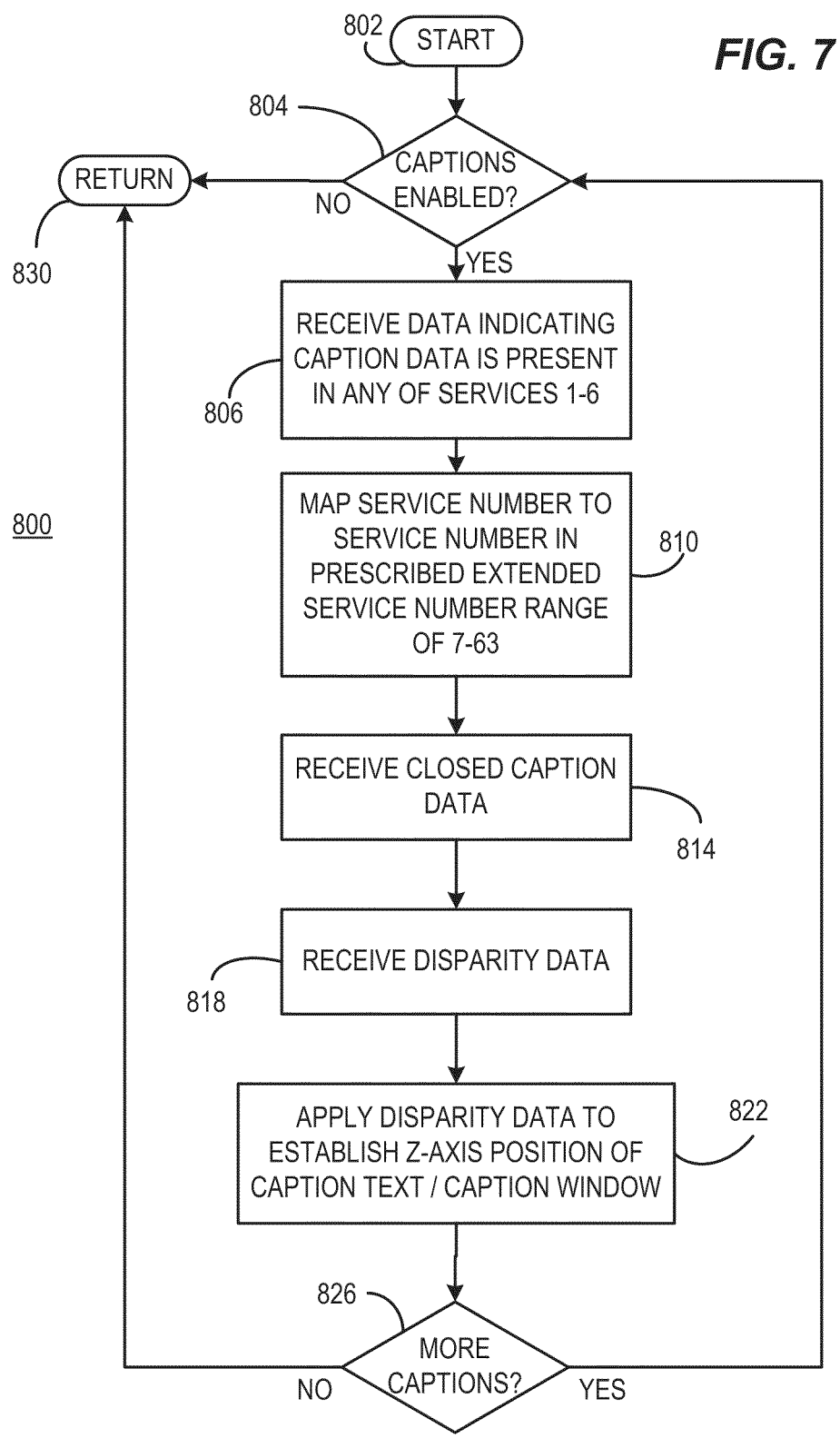

SERVICE LINKAGE TO CAPTION DISPARITY DATA TRANSPORT

CROSS REFERENCE TO RELATED DOCUMENTS

This application claims priority benefit of U.S. Provisional Patent Application No. 61/415,924 filed Nov. 22, 2010 entitled "Service Linkage to Caption Disparity Data Transport" to Mark Eyer, et al.; and this application claims priority benefit of U.S. Provisional Patent Applications No. 61/415,457 filed Nov. 19, 2010 entitled "Disparity Data Signaling and Transport for 3D Captioning" to Mark Eyer, et al.; 61/346,652 filed May 20, 2010 entitled "Disparity Data Transport" to Mark Eyer, et al.; and 61/313,612 filed Mar. 12, 2010 to Mark Eyer et al, and this application claims priority benefit of U.S. Provisional Patent Application No. 61/316,733 filed Mar. 23, 2010 entitled "Extended Command Stream for CEA-708 Captions" to Mark Eyer et al., and this application claims priority of U.S. Provisional Patent Application No. 61/378,792 filed Aug. 31, 2010 entitled "Efficient Transport of Frame-by-Frame Change in Captioning Disparity Data" to Mark Eyer; each of which is hereby incorporated by reference in their entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

When closed captions (CC) accompany a three dimensional (3D) stereoscopic video program, there is currently no standard that defines where the captions appear in the z-axis (depth) and how this information is to be conveyed to the receiver. Without such signaling, the captions may not be optimally placed on a video display so as to not interfere with other video objects or be interfered with by other video objects.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 7 is an example flow chart of a process consistent with certain embodiments of the present invention.

DETAILED DESCRIPTION

Figure 1:
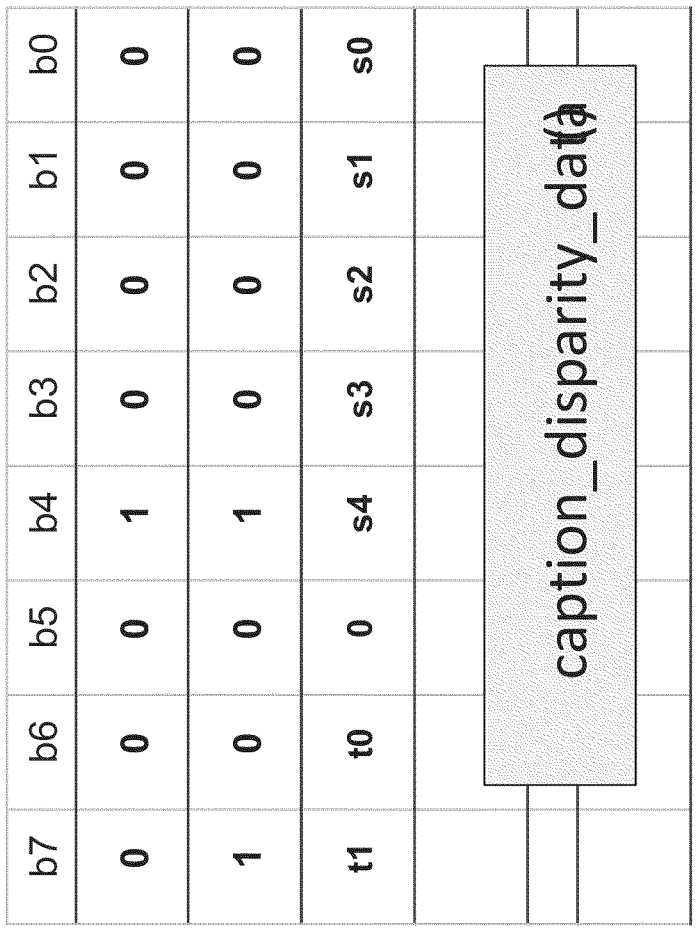
FIG. 1 is an example caption_disparity_data( ) command arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

When closed captioning is rendered in the display of a 3D video program, the CC window and associated text is likely to be rendered in the plane of the screen unless steps are taken to render the window and text such that they appear at a different, more appropriate, perceived depth. An object in a scene within 3D content may be presented such that it appears to the viewer to be some distance in front of the plane of the display screen. If a captioning window positioned in depth at the plane of the display were to be placed in front of that object, a "depth violation" would occur. In such a case, the viewer is presented with conflicting depth cues, a situation that causes eye fatigue and discomfort. Since captioning may intersect in the z-axis with content in the scene if it is simply positioned at the screen plane, the presentation of captioning is preferably individually authored to the subject matter of the video presentation. In order to accomplish this, extra information can be sent along with the captions to define the perceived placement on the z-axis (a designated distance in front or behind the plane of the screen) of a window containing the caption text for effective presentation and to avoid interference with objects in the scene. A number of techniques can be devised to provide this information, but many have disadvantages.

Stereoscopic 3D television involves delivery to the display screen of separate views for the left and right eyes, coupled with a method to allow each of the viewer's eyes to see only the image intended for that eye. The illusion of depth is achieved when, for a given object, the left- and right-eye views differ in the horizontal position of that object's placement. An overview of the basic technology relating to three dimensional display systems is described in "3D Display Systems" by Dr. Nick Holliman, Department of Computer Science, University of Durham, Science Laboratories, South Road, Durham DH1 3LE, UK (see particularly pp. 10-11 and FIG. 5), which is hereby incorporated by reference in the document's entirety.

The term "disparity" as used herein can be more formally referred to as "screen disparity" (i.e., as measured on the screen) as distinguished from "retinal disparity" and is defined as the difference of the physical x coordinates of corresponding points in the right and left images in a pair of aligned stereo images displayed on a screen. The less formal term "disparity" will be used herein for simplicity. By convention, when disparity is negative (e.g. when the left-eye image is rendered on the screen to the right of the right-eye image), the object is perceived as being in front of the plane of the screen. When disparity is positive (e.g. when the left-eye image is rendered on-screen to the left of the right-eye image), the object is perceived as being behind the screen plane.

The term "disparity data" can refer to any data indicating the disparity value to be used in rendering a given graphical object, such as a caption window and its associated text. The term can also be used more generally to refer to data reflecting the z-axis positions of objects in the current scene. The scene area can be mapped out into regions, with the z-axis position of the object in each region that is closest to the viewer recorded as a coordinate in the map. Such a map may be called a "disparity map" or a "depth map." Disparity maps can change on a frame-by-frame basis and can be represented in any number of ways. It is noted that disparity is a measure of the horizontal offset of left eye and right eye images, but the offset need not be in an integer number of pixels as fractional pixel offsets are perfectly acceptable.

Within the context of delivery of 3D video and CC content for display, disparity is generally represented as a percentage of the width of the accompanying video. As such, it is a dimensionless number. For example, the signaling scheme may specify that one unit of disparity is equal to $1/1920$ of the width of the video content (which is generally rendered to match the width of the display screen). But, a disparity of $1/1920$ is not the minimum increment in actual disparity even with a screen width of 1920. With this definition, a disparity of 7 refers to a distance equal to $7/1920$ of the width of the video content. Again with this definition, in the special case of a screen with 1920 pixels of horizontal resolution, this works out such that one full unit of disparity is the same width as one display pixel, but this should be thought of as a special case. If a display screen has fewer than 1920 horizontal pixels, e.g., 1600 horizontal pixels, then disparity is scaled accordingly and a disparity of 7 equates to $(7/1920)(1600)=5.83$ pixels. Hence, disparity should most properly be viewed as the difference in the physical location on the screen along the x axis (horizontal) of corresponding points in left eye and right eye images in a pair of aligned stereoscopic images. It is also noteworthy that the CC window will generally be a two dimensional window which is positioned along the z-axis and which is perceived to be in a plane parallel to the plane of the display screen.

The subject matter herein addresses a problem involving the transport of data to support 3D caption services. A method is needed to deliver data in the DTV Caption Channel of CEA-708 compliant devices that can as nearly as possible be assured to be backwards-compatible with legacy (existing, fielded) caption decoders. One possibility is to use the Extended Channel as described in U.S. patent application Ser. No. 13/022,810 filed of even date herewith entitled "EXTENDED COMMAND STREAM FOR CLOSED CAPTION DISPARITY", to Eyer et al., which is hereby incorporated in its entirety by reference.

Closed captioning data for 3D audio/video content includes both the definition of caption window attributes and text as well as the disparity data specifying the z-axis position (depth) that each caption window is to be rendered on top of 3D video. In some content creation and distribution scenarios, a 2D version of the same content is distributed to receivers through a different path (for example, to be broadcast on a different channel on cable). The same closed captioning data, including disparity data, may accompany the 2D version of the content. Since the 2D version of the content is processed by non-3D-capable receivers (which may be called "legacy" receivers), the disparity data should be properly disregarded, or skipped over, when the captioning data is processed.

The CEA standard for advanced captioning, CEA-708, included a number of provisions intended to allow future extensions to the standard to be made. Using one of these extensions for the addition of disparity data would seem to be a logical choice, however implementations of CEA-708 caption decoders have been found to be deficient with respect to the way they handle some of these extensions. CEA-708 standard is unclear or confusing in some areas, a fact that contributes to implementation errors or omissions.

Methods have been sought to minimize the possibility that legacy decoders would be adversely affected by the presence of disparity data in the captioning stream. A method described herein involves delivering disparity data within a separate caption service that is known to be associated with one of the standard caption services.

The CEA-708 advanced captioning standard supports multiple simultaneous caption services so that, for example, captioning in different languages can be offered for the same program. CEA-708 defines a "minimum decoder" in Section 9. A minimum decoder is required to process the "standard" service numbers 1 through 6. Processing "Extended" services 7 through 63 is optional. Quoting from the standard, "Decoders shall be capable of decoding all Caption Channel Block Headers consisting of Standard Service Headers, Extended Service Block Headers, and Null Block headers."

The disparity data transport method described herein involves placing the 3D data in services identified with Service Numbers in the Extended range (7-63). A standard method for carrying disparity data could be envisioned in which one Extended service, for example Service Number 63, would carry the 3D-related data for Standard service number 1. This method would be insufficient, however, to handle the case of multiple simultaneous caption services (such as English and Spanish captioning being offered simultaneously).

A system could be designed where Extended service 63 (or some other service number in the 7-62 range) could carry 3D data for one or more standard services. Within Extended service 63, for example, signaling could be present to associate a certain block of 3D data with a particular one of the Standard services (1-6). Such a method, while possible, would be awkward and inefficient. The timing of the transmission of 3D data should be closely matched to the caption data establishing the caption window definitions and text. If the 3D data for multiple Standard services is transported within a single Extended service, decoders would encounter data blocks for Standard services they are not decoding, resulting in wasted effort.

The present subject matter overcomes the above limitations by defining a mapping between Service Numbers 1-6 and six Extended service numbers. A 3D-capable receiver, when decoding captions for Standard service #1, would also process service blocks for the Extended service that is mapped to Standard service #1. The mapped Extended service would contain only 3D data associated with Standard service #1 and no other service. For simplicity and efficiency, a standard mapping could be used. An additional aspect of the present subject matter involves the method where the data structure used to transport the 3D disparity data uses an extensibility feature of CEA-708 called the "variable-length" command as defined in CEA-708-D Sec. 7.1.11.2. Such a method would not be suitable for use within the context of Standard services, because it is believed that a significant population of legacy receivers exist that are not able to handle this feature. Such receivers would likely display garbled caption output on-screen if they would encounter one of these Variable Length Commands. However, if the disparity data is delivered in a service block with an Extended Service Number, this is not a problem. It is believed that all existing receivers are able to skip service blocks (including Extended services) corresponding to service numbers they are not currently decoding. If any legacy receiver attempts to decode disparity data (which should not normally occur, as caption services containing disparity data are not announced in the Caption Service Descriptor), if the receiver is built according to CEA-708-D, it will simply disregard the contents of the command.

Summarizing from above, several problems to be addressed are:
1. The need for a delivery method for 3D disparity data that is compatible with legacy devices (e.g. does not produce anomalous output when they are processing the caption data for a 2D version of the broadcast).
2. Using one Service Number in the "extended" range (7-63) is helpful, but not a complete solution.
3. If 3D disparity data is sent in a caption service identified with an Extended Service Number, either the full 2D data would need to be replicated (which is wasteful of bandwidth), or the Service Number of the 2D service this 3D service is linked to would need to be transmitted (also wasteful of bandwidth).
4. 3D disparity data in the service identified with an Extended Service Number could possibly be decoded by a legacy decoder (if such a decoder allowed the user to select services by number). In this case, the legacy device, if built compliant to CEA-708-D, would decode correctly—it should simply discard the 3D data as an unsupported command.

To the extent this problem has been addressed within standardization committees, the solution has been to limit the number of 3D disparity services to one, and not to consider the behavior of legacy devices if they see the 3D data stream. A method is needed for command syntax when Extended Service Numbers are used.

Accordingly, in one solution consistent with implementation of embodiments of the present invention, to provide the capability to deliver multiple 3D disparity data services (e.g. to support multiple simultaneous caption services needing 3D data), a mapping scheme is used. The following example mapping table is one example of a mapping that could be used:

| Main Caption Service Number | Extended Service Number of 3D Disparity Service |
| --- | --- |
| 1 | 49 |
| 2 | 50 |
| 3 | 51 |
| 4 | 52 |
| 5 | 53 |
| 6 | 54 |

The number 49 is chosen in this example because, in binary, the Service Number it corresponds with (e.g. provides additional commands for) is indicated in the least-significant 3 bits. In this manner, upon application of a "bit mask" onto the service number, the extended service number conveniently "self-maps" to the service number. E.g. the (Extended Service Number) bitwise-ANDed with 7 (111 in binary) yields the associated Main Caption Service Number. However, this method should not be considered limiting since other mappings could be chosen as well. For example, 1 could be associated with 51, 2 with 52, etc. In another example, the mapped extended service numbers can be mapped as 1 to 57, 2 to 58, 3 to 59, 4 to 60, 5 to 61 and 6 to 62. In other examples, the mapped extended service number need not have any of the limitations of being sequential, being selected from the examples above or having any particular arrangement of bits when represented in binary.

To optimize compatibility with legacy decoders (while not being able to absolutely guarantee that all legacy decoders would be able to properly disregard the new command), the Variable Length Command as defined in CEA-708-D Sec. 7.1.11.2 can be used. Such commands use the "C3" command ("C3 Code Set—Extended Control Code Set 2"). If properly implemented, legacy decoders should skip variable length commands further assuring that they will not take an unpredictable action.

Hence, in order to help assure that legacy decoders will not malfunction due to attempting to process disparity data, Extended Service numbers are used for the disparity data. Multiple captions services can be accommodated by use of different Extended Service numbers (7-63) that are mapped to Standard service numbers 1-6. If done according to the teachings herein, there is no need to explicitly identify the service number in the data structure, since it is automatically mapped to an Extended Service number. To further prevent legacy decoders from attempting to render the services, a variable-length command can be used to define the disparity data in any suitable manner. While some legacy decoders may not properly implement the "skip variable length extensions" feature as defined in CEA-708, viewers are never given an option to choose extended service numbers anyway since these are unannounced services that a user cannot generally select from (as for example one might select a language for captions). These services are not announced in the Caption Service Descriptor (CSD) defined in ATSC A/65 *Program and System Information Protocol* (PSIP), and most receivers do not implement Extended Service numbers (i.e., they only comply with the CEA-708 section 9 minimum requirements).

An example variable length disparity command is depicted as 100 in FIG. 1. As specified in CEA-708-D Section 7.1.11.2, variable-length commands are indicated by the EXT1 character followed by a number in the range 0x90 to 0x9F, where the "0x" notation denotes a number represented in hexadecimal format. In the command format depicted in FIG. 1, the EXT1 character (0x10) is followed by 0x90. In this context, 0x90 is the command identifier for the SetDisparity command. In accordance with the syntax defined in CEA-708-D Section 7.1.11.2, the next byte contains a two-bit Type field, a zero bit, followed by a 5-bit length field.

The caption_disparity_data( ) data structure follows the byte containing the length field. The syntax of one example of the caption disparity data is depicted in pseudocode in TABLE 1 below:

TABLE 1

Example Caption Disparity Data Syntax

|  | Bits | Format | Bytes |
|---|---|---|---|
| caption_disparity_data( ) { |  |  |  |
|   Reserved | 5 | bslbf | 1 |
|   caption_window_count | 3 | uimsbf |  |
|   for ( i=0 ; i < caption_window_count; i++ ) { |  |  |  |
|     caption_window_id    /* = i | 3 | uimsbf | 2 |
|     temporal_extension_flag | 1 | bslbf |  |
|     reserved | 3 | bslbf |  |
|     disparity[i] | 9 | simsbf |  |
|     if (temporal_extension_flag) { |  |  |  |
|       alternate_disparity[i] | 9 | simsbf | 2 |
|       reserved | 2 | bslbf |  |
|       segment_count | 5 | uimsbf |  |
|       for (k=0; k<segment_count; k++) { |  |  |  |
|         frame_count | 5 | uimsbf | 1.25 |
|         segment_slope_change | 5 | simsbf |  |
|       } |  |  |  |
|       for (m=0; m<(3-((segment_count-1) mod 4)); m++) { |  |  |  |
|         reserved | 2 | bslbf | 0.25 |
|       } |  |  |  |
|     } |  |  |  |
|   } |  |  |  |
| } |  |  |  |

In TABLE 1, "bslbf" means "bit serial, leftmost bit first," "uimsbf" means "unsigned integer, most significant bit first," and "simsbf" means "signed integer, most significant bit first." Fields labeled "reserved" are not defined now, but are to be disregarded by receivers until such time that they are defined in a later release of the standard.

Figure 2:
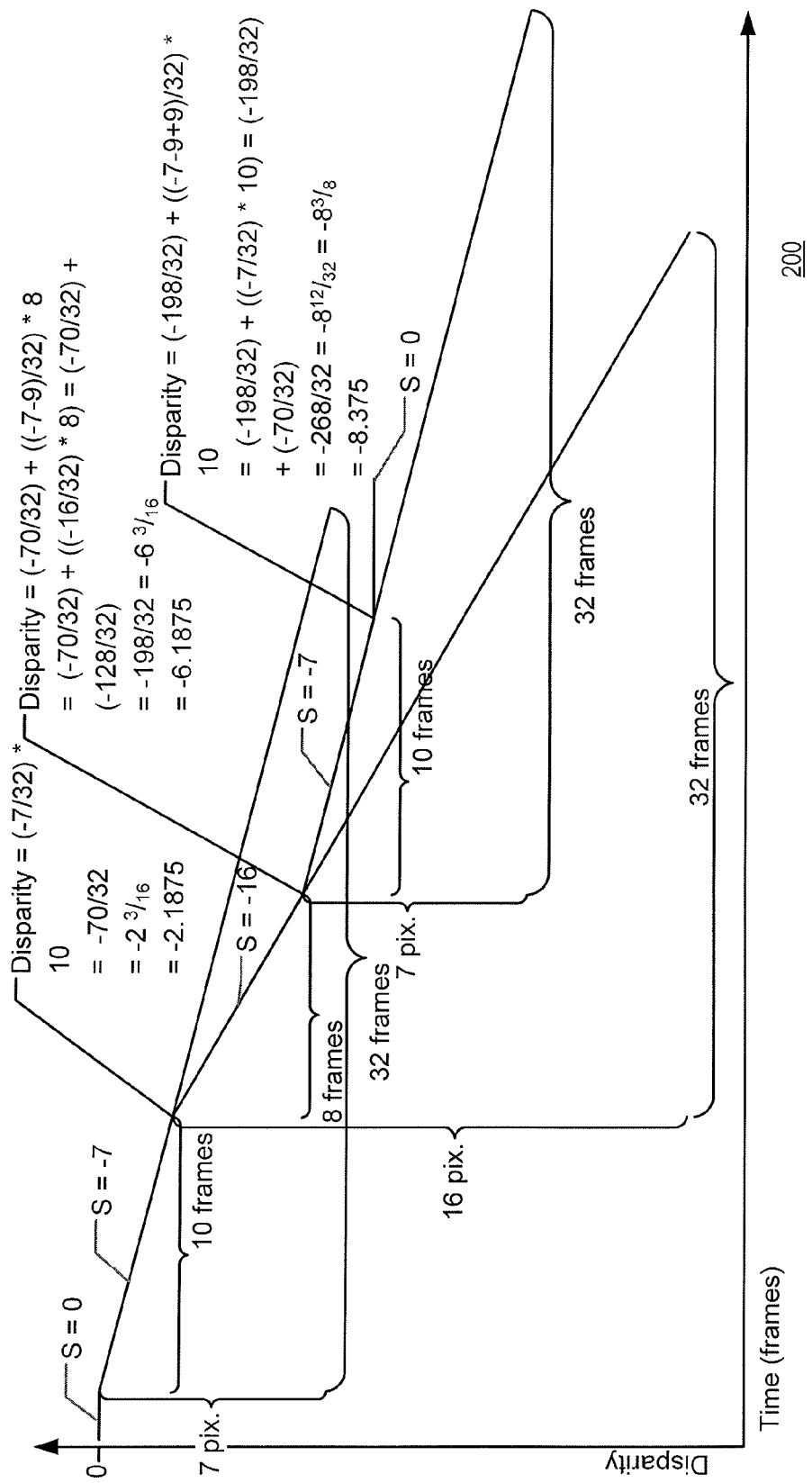
FIG. 2 is an example piecewise linear approximation of authored disparity data consistent with certain embodiments of the present invention.

This example TABLE 1 can for example utilize a mechanism as described in U.S. patent application Ser. No. 13/022,817 filed of even date herewith entitled "Disparity Data Transport and Signaling" to Eyer et al., which is incorporated herein in its entirety by reference, for calling out disparity data as a number of frames and a piecewise linear modeling of authored disparity. In this method, as described in the application above, the slope of each line segments and number of frames for which the slope applies is used to define the disparity. An example of a piecewise linear approximation according to this technique is depicted in FIG. 2 as 200 for a sequence of line segments represented by (frames, slope chg.)=(2,+7),(10,+9),(8,−7),(10,−9), where the initial slope is presumed to be zero. However, this mechanism can be utilized to carry any other suitable representation of disparity as desired.

The variables described above in this example TABLE 1 have the following meaning (by way of example and not limitation), and the definitions presented are in a format suitable for use in a technical standard such as an update to the CEA-708 advanced captioning standard.

caption_window_count—a 3-bit unsigned integer that indicates the number of caption windows included in this instance of the caption_disparity_data( ).

caption_window_id—a 3-bit unsigned integer that identifies the Window ID in the corresponding service for which disparity data is being given in this iteration of the "for" loop temporal_extension_flag—a 1-bit flag that, when set to "1", indicates data is included that identifies a time-varying disparity path.

disparity[i]—a 9-bit signed integer that indicates the disparity value of the associated caption window, relative to 1920 horizontal pixels. Value zero indicates the screen plane (no disparity). Negative values correspond with perceived depths in front of the screen; positive values behind.

alternate_disparity[i]—a 9-bit signed integer that is coded the same as disparity[i]; it provides a disparity value that may be used in place of the values given in the piecewise-linear path by decoders that are not able to render time-varying caption windows.

segment_count—a 5-bit unsigned integer in the range 1 to 31 that indicate the number of segments to follow.

frame_count—a 5-bit unsigned integer in the range 0 to 31 that indicates the number of video frames to wait before applying the segment_slope_change to follow.

segment_slope_change—a 5-bit 2's complement signed integer in the range −16 to +15 that indicates the amount of change in slope to apply at the frame indicated in frame_count. Slopes are specified in number of pixels of disparity over 32 frames.

Figure 3:
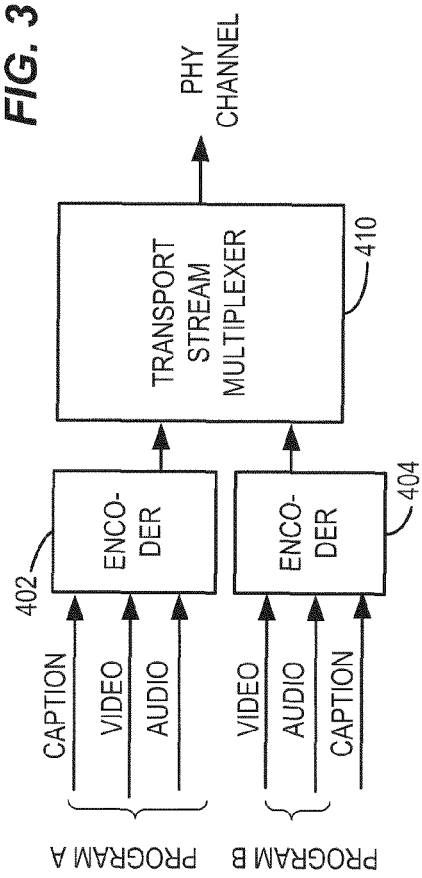
FIG. 3 is an example encoder consistent with certain embodiments of the present invention.

Referring now to FIG. 3, a basic diagram of a service provider such as a broadcaster is depicted. Generally speaking, a single service provider may provide multiple programs over one or more transport streams. The audio, video and caption data are provided to an encoder which encodes the data into packets suitable for distribution, including caption data packets as described above. As shown, Program A and Program B are encoded by encoders 402 and 404 which are then provided to a transport stream multiplexer 410 which then provides an output that can be distributed via a physical channel medium such as cable or satellite broadcast.

Figure 4:
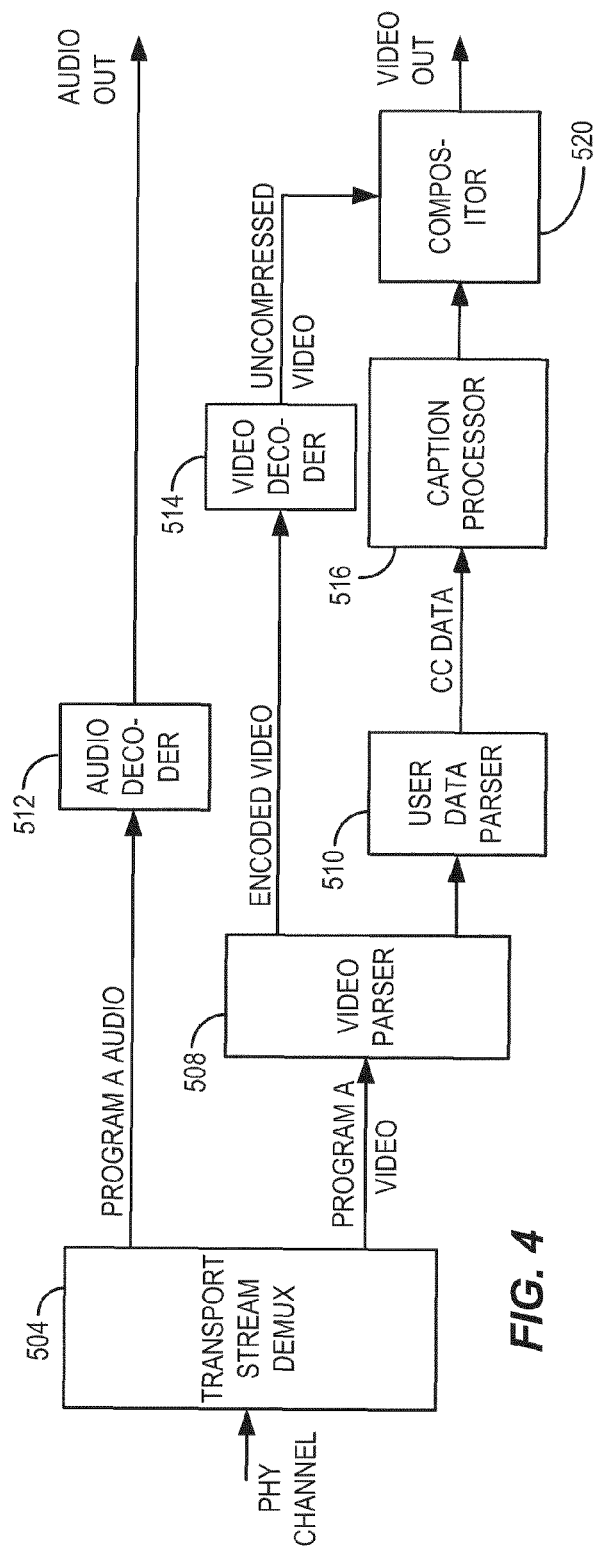
FIG. 4 is an example decoder consistent with certain embodiments of the present invention.

This encoded data from the physical channel is received at a television receiver device (e.g., a television or a set top box) as depicted in FIG. 4. The transport stream is demultiplexed at transport stream demultiplexer 504 to produce one or more program streams including audio, video and caption data (as well as possibly other data not shown). Video packets from Program A are passed from demultiplexer 504 to video parser 508. Audio packets from Program A are passed from demultiplexer 504 to audio decoder 512 which in turn produces the audio output. Video parser 508 extracts video packets from the video stream and passes them to video decoder 514. Video parser 508 extracts user data from the video stream and passes it to user data parser 510. User data parser 510 extracts closed captioning data from within user data packets and passes it to caption processor 516. Within the caption processor 516, caption service blocks containing data for caption services other than the one of interest are filtered out and discarded. When the video content is 3D, caption processor 516 processes caption service blocks corresponding to the Main service of interest, while at the same time processing caption service blocks corresponding to the mapped Extended service. The output of caption processor 516 is the graphical representation of the closed captions, typically text enclosed in caption windows. For 3D content, the output of caption processor 516 is separate outputs of captioning for the left-eye view and the right eye views, with appropriate disparity applied to establish the perceived depth (z-plane position) of each caption window.

The caption graphics are composited at compositor 520 with the video data so as to produce 3D video with captions placed according to the data in the caption data packets in the x, y and z plane. Such data may place the captions in the z-axis in a static manner or dynamically in according with the authoring of the caption data.

Figure 5:
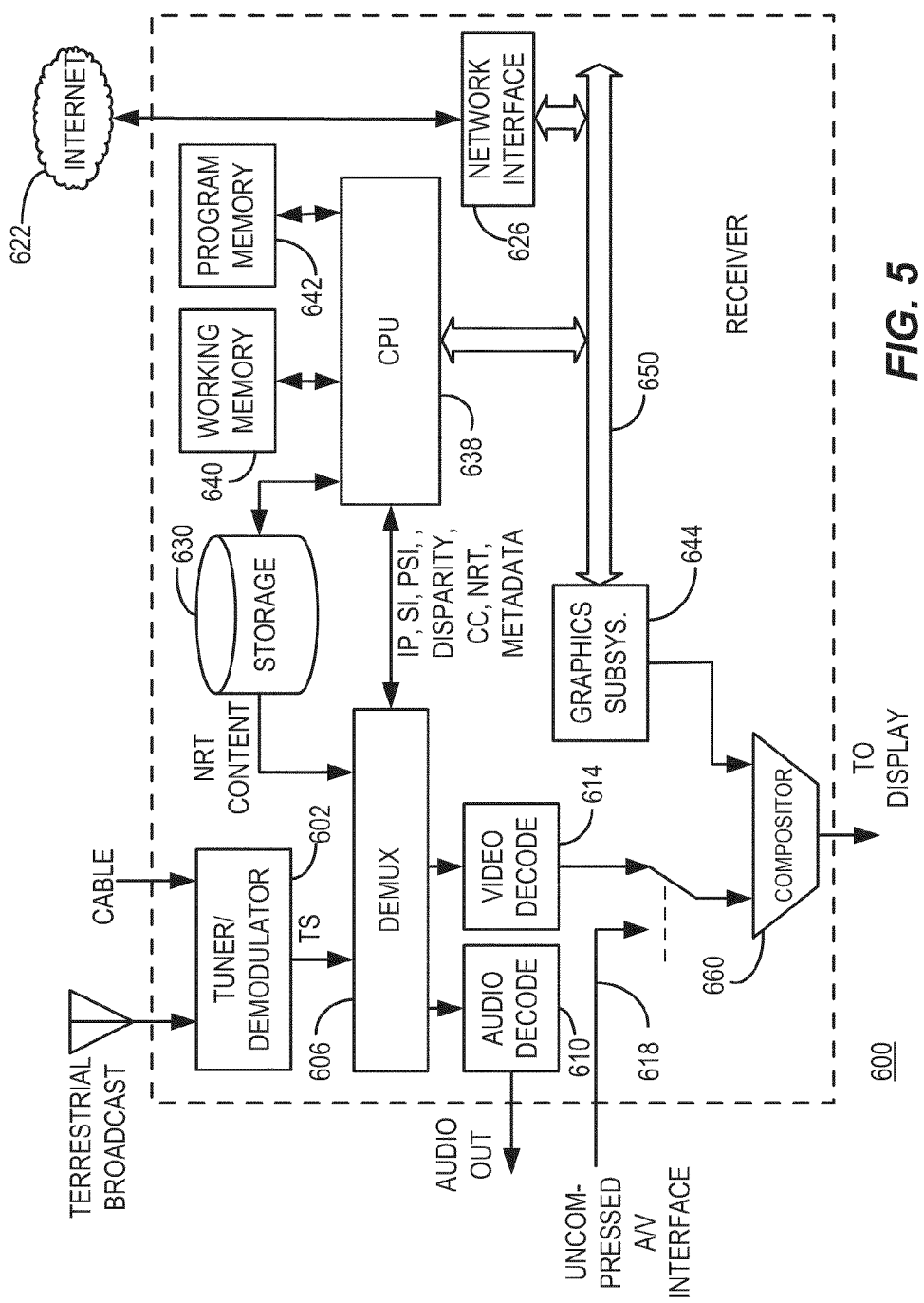
FIG. 5 is an example television receiver device consistent with certain embodiments of the present invention.

A receiver device is depicted in greater detail in FIG. 5 wherein content is received via any suitable source such as terrestrial broadcast, cable or satellite at a receiver 600's tuner/demodulator 602. The transport stream from the tuner/demodulator 602 is demultiplexed at demultiplexer 606 into audio and video streams. The audio is decoded at an audio decoder 610 while the video is decoded at a video decoder 614. Uncompressed A/V data may also be received via an uncompressed A/V interface 618 that can be selectively utilized.

A/V content may also be received via the Internet 622 via a network interface 626 for IP television content decoding. Additionally, storage 630 can be provided for non-real time (NRT) stored content. The NRT content can be played by demultiplexing at 606 in a manner similar to that of other sources of content. The receiver generally operates under control of a processor such as CPU 638 which is interconnected to working memory 640 and program memory 642 as well as a graphics subsystem 644 via one or more buses such as 650.

The CPU 638 receives closed caption data from the demultiplexer 606 as well as the disparity data via the mechanism described herein and determines by parsing the data in the extended service what z-position as well as x and y position to locate the caption data. This information is passed to the graphics subsystem 644 and the images are composited at the compositor 660 to produce an output suitable for processing and display on a video display.

Figure 6:
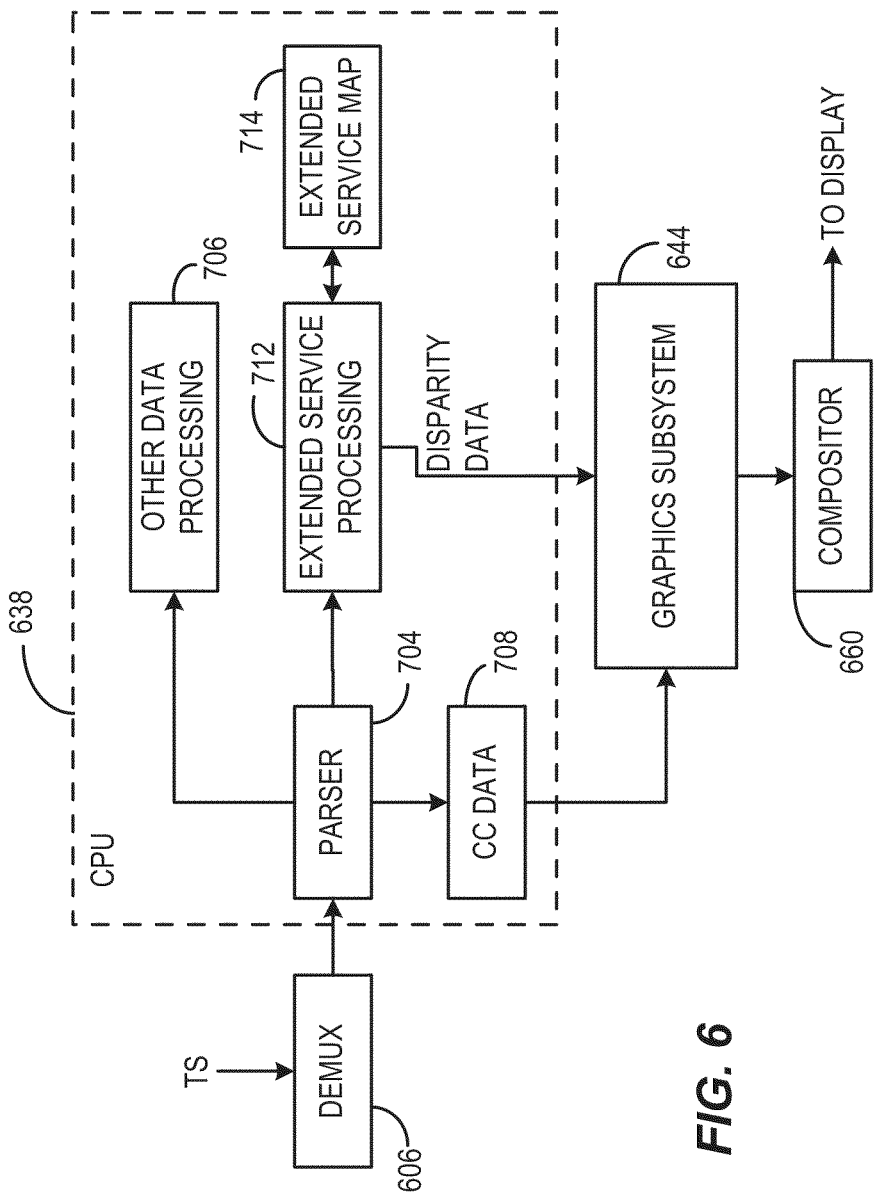
FIG. 6 is an example block diagram depicting the various operations of a processor consistent with certain embodiments of the present invention.

FIG. 6 depicts one implementation of the program modules used to process the caption data supplied in the manner described herein. In this example implementation, the CPU 638 operating under program control from program memory 642 and using working memory 640 receives the demultiplexed transport stream from demultiplexer 606 and a parser module 704 produces the caption data (that is, the caption text) at 708 and determines from the extended service processing module 712 that the service referenced in the service number presented corresponds to an extended service mapped in the extended service map table 714 where the disparity data are extracted from the extended service's service blocks of data for use by the graphics subsystem 644 for processing. Other data may be parsed by parser 704 to other data processing modules as indicated by 706. The processed caption data are then composited at compositor 660 with the video data from the demultiplexer 606 to produce data for display with the position of the CC data positioned as specified in the z-axis.

Thus, a television receiver device that processes disparity data for closed captions has a receiver that receives closed caption data including closed caption text within a service block having a service number in the range of 1-6; One or more processors such as 638 map the service number to a corresponding mapped extended service that is an unannounced service. A parser process such as 704 parses the disparity data from the closed caption data appearing in the mapped extended service. The parser further receives closed caption text data from the transport stream. A compositor such as 660 receives and processes the disparity data and the caption text to produce an output suitable for defining a rendering of a three dimensional image on a display of the caption text at a z-axis position defined by the disparity data.

In certain implementations, the extended service corresponds to a service number in the range of 7 through 63. In certain implementations, the disparity data are carried in a CEA-708 compliant variable length command. In certain implementations, the mapped extended service numbers are mapped as 1 to 49, 2 to 50, 3 to 51, 4 to 52, 5 to 53 and 6 to 54 while in others, the mapped extended service numbers are mapped as 1 to 57, 2 to 58, 3 to 59, 4 to 60, 5 to 61 and 6 to 62. In certain implementations, the mapped extended service numbers when represented in binary uniquely identify the associated service number by the extended service number's three least significant bits.

An overall process consistent with example implementations of the current invention is depicted in the flow chart 800 of FIG. 7 starting at 802. If captions are enabled at 804, then at 806, data is received indicating that caption data is present in any of service numbers 1-6. The service number selected is mapped to an extended service number within the range of 7-63 at 810. At 814, closed caption text is received and at 818 closed caption disparity data are received. It will be understood that these events are a continuous flow with text and caption data being received on an ongoing basis, so that the present representation is not to be construed as accurately depicting time. The disparity data is processed at 822 to determine the z-axis position of the closed caption text and the closed caption window containing the text and this data can then be output to produce composited display data. The process continues to receive closed caption text and disparity data until the end of the disparity and caption data at 826 where the process returns at 830. If more captions are available at 826, the process goes to 804 and repeats provided captioning is still enabled. If captioning is disabled at 804, the process returns at 830.

Thus, a method of processing disparity data for closed captions for three dimensional video involves receiving closed caption data including closed caption text within a service block having a service number in the range of 1-6; mapping the service number to a corresponding mapped extended service having a service number in the range of 7 through 63 that is an unannounced service as in 810. The disparity data is parsed from the closed caption data appearing in the mapped extended service. The process then proceeds in receiving closed caption text data and processing the caption text and disparity data to produce an output suitable for defining a rendering of a three dimensional image on a display of the caption text at a z-axis position defined by the disparity data, where the disparity data are carried in a CEA-708 compliant variable length command.

In certain implementations, a method of processing disparity data for closed captions for three dimensional video involves receiving closed caption data including closed caption text within a service block having a service number in the range of 1-6; mapping the service number to a corresponding mapped extended service having a service number in the range of 7 through 63; parsing the disparity data from the closed caption data appearing in the mapped extended service; receiving closed caption text data; and processing the caption text and disparity data to produce an output suitable for defining a rendering of a three dimensional image on a display of the caption text at a z-axis position defined by the disparity data.

Many variations will occur to those skilled in the art upon consideration of the present teachings. For example in certain implementations, the disparity data are carried in a CEA-708 compliant variable length command in order to further prevent legacy receivers from taking action on the higher numbered extended services. In certain implementations, the mapped extended service numbers are mapped as 1 to 49, 2 to 50, 3 to 51, 4 to 52, 5 to 53 and 6 to 54 while in other implementations, the mapped extended service numbers are mapped as 1 to 57, 2 to 58, 3 to 59, 4 to 60, 5 to 61 and 6 to 62. In certain implementations, the mapped extended service numbers when represented in binary uniquely identify the associated service number by the extended service number's three least significant bits.

Another example method of processing disparity data for closed captions for three dimensional video involves receiving closed caption data including closed caption text within a service block having a service number in the range of 1-6; mapping the service number to a corresponding mapped extended service that is an unannounced service; parsing the disparity data from the closed caption data appearing in the mapped extended service; receiving closed caption text data; and processing the caption text and disparity data to produce an output suitable for defining a rendering of a three dimensional image on a display of the caption text at a z-axis position defined by the disparity data.

In certain implementations, the extended service corresponds to a service number in the range of 7 through 63. In certain implementations the disparity data are carried in a CEA-708 compliant variable length command. In certain implementations, the mapped extended service numbers are mapped as 1 to 49, 2 to 50, 3 to 51, 4 to 52, 5 to 53 and 6 to 54 while in others other mappings can be used such as 1 to 57, 2 to 58, 3 to 59, 4 to 60, 5 to 61 and 6 to 62. In certain implementations the mapped extended service numbers when represented in binary uniquely identify the associated service number by the extended service number's three least significant bits.

Those skilled in the art will appreciate that the above described processes can be carried out by use of one or more computer readable storage media including non-transitory storage media storing instructions that when executed on one or more programmed processors execute the method.

It is noted that the disparity data can be delivered as a continuous stream or can be pre-delivered in advance.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of processing disparity data for closed captions for three dimensional video, comprising:
receiving closed caption data including closed caption text within a service block having a service number in the range of 1-6;
mapping the service number to a corresponding mapped extended service having a service number in the range of 7 through 63 that is an unannounced service;
parsing the disparity data from the closed caption data appearing in the mapped extended service;
receiving closed caption text data;
processing the caption text and disparity data to produce an output suitable for defining a rendering of a three dimensional image on a display of the caption text at a z-axis position defined by the disparity data; and
where the disparity data are carried in a CEA-708 compliant variable length command.

2. A method of processing disparity data for closed captions for three dimensional video, comprising:
receiving closed caption data including closed caption text within a service block having a service number in the range of 1-6;
mapping the service number to a corresponding mapped extended service having a service number in the range of 7 through 63;
parsing the disparity data from the closed caption data appearing in the mapped extended service;
receiving closed caption text data; and
processing the caption text and disparity data to produce an output suitable for defining a rendering of a three dimensional image on a display of the caption text at a z-axis position defined by the disparity data.

3. The method according to claim 2, where the disparity data are carried in a CEA-708 compliant variable length command.

4. The method according to claim 2 where the mapped extended service numbers are mapped as 1 to 49, 2 to 50, 3 to 51, 4 to 52, 5 to 53 and 6 to 54.

5. The method according to claim 2, where the mapped extended service numbers are mapped as 1 to 57, 2 to 58, 3 to 59, 4 to 60, 5 to 61 and 6 to 62.

6. The method according to claim 2, where the mapped extended service numbers when represented in binary uniquely identify the associated service number by the extended service number's three least significant bits.

7. A non-transitory computer readable storage medium storing instructions that when executed on one or more programmed processors execute a method according to claim 2.

8. A method of processing disparity data for closed captions for three dimensional video, comprising:
receiving closed caption data including closed caption text within a service block having a service number in the range of 1-6;
mapping the service number to a corresponding mapped extended service that is an unannounced service;
parsing the disparity data from the closed caption data appearing in the mapped extended service;
receiving closed caption text data; and
processing the caption text and disparity data to produce an output suitable for defining a rendering of a three dimensional image on a display of the caption text at a z-axis position defined by the disparity data.

9. The method according to claim 8, where the extended service corresponds to a service number in the range of 7 through 63.

10. The method according to claim 8, where the disparity data are carried in a CEA-708 compliant variable length command.

11. The method according to claim 8, where the mapped extended service numbers are mapped as 1 to 49, 2 to 50, 3 to 51, 4 to 52, 5 to 53 and 6 to 54.

12. The method according to claim 8, where the mapped extended service numbers are mapped as 1 to 57, 2 to 58, 3 to 59, 4 to 60, 5 to 61 and 6 to 62.

13. The method according to claim 8, where the mapped extended service numbers when represented in binary uniquely identify the associated service number by the extended service number's three least significant bits.

14. A non-transitory computer readable storage medium storing instructions that when executed on one or more programmed processors execute a method according to claim 8.

15. A television receiver device that processes disparity data for closed captions, comprising:
a receiver that receives closed caption data including closed caption text within a service block having a service number in the range of 1-6;
one or more processors that map the service number to a corresponding mapped extended service that corresponds to an unannounced service;
a parser that parses the disparity data from the closed caption data appearing in the mapped extended service;
the parser further receiving closed caption text data from the transport stream; and
a compositor that receives and processes the disparity data and the caption text to produce an output suitable for defining a rendering of a three dimensional image on a display of the caption text at a z-axis position defined by the disparity data.

16. The device according to claim 15, where the extended service corresponds to a service number in the range of 7 through 63.

17. The device according to claim 15, where the disparity data are carried in a CEA-708 compliant variable length command.

18. The method according to claim 15, where the mapped extended service numbers are mapped as 1 to 49, 2 to 50, 3 to 51, 4 to 52, 5 to 53 and 6 to 54.

19. The method according to claim 15, where the mapped extended service numbers are mapped as 1 to 57, 2 to 58, 3 to 59, 4 to 60, 5 to 61 and 6 to 62.

20. The method according to claim 15, where the mapped extended service numbers when represented in binary uniquely identify the associated service number by the extended service number's three least significant bits.

21. A television receiver device that processes disparity data for closed captions, comprising:
a receiver that receives closed caption data including closed caption text within a service block having a service number in the range of 1-6;
one or more processors that map the service number to a corresponding mapped extended service in the range of 7-63 that corresponds to an unannounced service, where the mapped extended service numbers when represented in binary uniquely identify the associated service number by the extended service number's least significant bits;
a parser that parses the disparity data from the closed caption data appearing in the mapped extended service, where the disparity data are carried in a CEA-708 compliant variable length command;
a filter that removes closed caption service data for caption services not being used;

the parser further receiving closed caption text data from the transport stream; and a compositor that receives and processes the disparity data and the caption text to produce an output suitable for defining a rendering of a three dimensional image on a display of the caption text at a z-axis position defined by the disparity data, where the disparity data includes a disparity value and a number of video frames for which the disparity value is to be used.

\* \* \* \* \*